No. 647,626. Patented Apr. 17, 1900.
D. GILMOUR.
LUMBER.
(Application filed July 27, 1899.)
(No Model.)
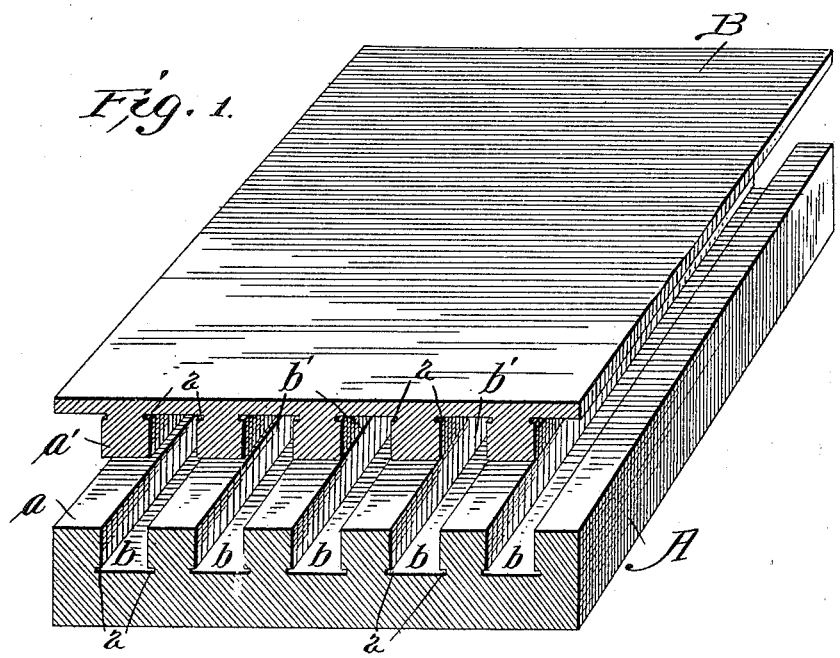
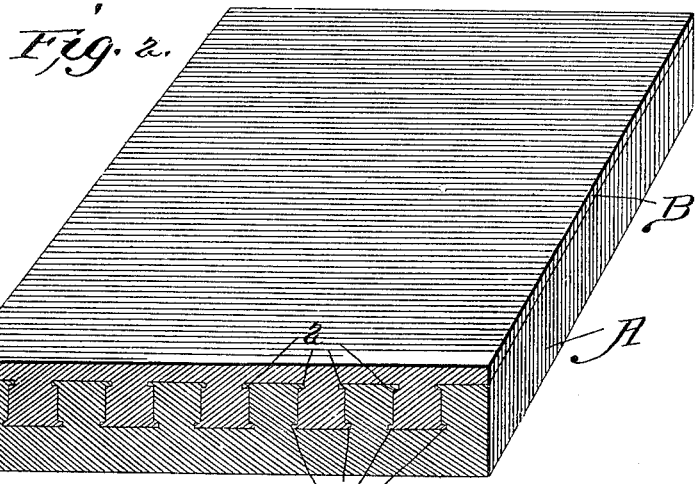
Attest
F. L. Murdmter
Henry E. Cooper
Inventor
David Gilmour
by Fetherstonhaugh & Co
Atty.

UNITED STATES PATENT OFFICE.

DAVID GILMOUR, OF TRENTON, CANADA.

LUMBER.

SPECIFICATION forming part of Letters Patent No. 647,626, dated April 17, 1900.

Application filed July 27, 1899. Serial No. 725,314. (No model.)

*To all whom it may concern:*

Be it known that I, DAVID GILMOUR, a subject of the Queen of Great Britain, residing at Trenton, Province of Ontario, Canada, have invented certain new and useful Improvements in Lumber, of which the following is a specification.

My invention relates to lumber composed of two different qualities or kinds of wood, the object being to utilize a greater proportion of the lower or cheaper grades of material, principally such as those from trees or parts of trees from the forest worm-eaten or defective by knots or other defects or from comparatively refuse material from sawmills, which cheaper or defective material is combined as a body with a surface of clear lumber or of lumber of a better kind or quality than the body, whereby a finished product is obtained, the body or greater proportion of which is of the cheaper or defective material, but the surface of which is of high grade, and the whole for all practical purposes as good as or better than the lumber composed wholly of high-grade material.

My invention relates more particularly to such lumber when the two parts are united by tongues and grooves, as is shown in an application filed by me in the United States Patent Office of even date herewith, Serial No. 725,315.

The particular object of my invention is to form a more complete bond between the two parts and to enable the manufacturer to dispense with the use of cement or glue.

My invention is illustrated in the accompanying drawings, in which—

Figure 1 shows in perspective the two parts with the tongues and grooves separate. Fig. 2 shows also in perspective the two parts united, forming a piece of complete lumber.

In the figures, A represents the body or under portion of the material, which may be of cheap or defective quality, as aforesaid, and which is thicker than the surface part. The upper or surface part is shown at B. Both have corresponding tongues and grooves, the tongues being marked $a\ a'$ and the grooves $b\ b'$, respectively, these grooves running longitudinally of the grain. At or near the bottom of the grooves in both parts I form small lateral grooves, (marked 2.) These may be as shallow as the thirty-second part of an inch, but preferably I make them deeper and run them the whole length of the groove. The tongues being formed to fit in the grooves, when the parts have been put together and subjected to pressure the whole is condensed, and thus there is surplus material in the tongues to expand into the small grooves. The parts are put together with the tongues and grooves interlocking and are pressed together with great force by passing them between rollers preferably heated, so that the fibers of the tongues opposite the small lateral grooves are pressed laterally therein, forming ribs, interlocking and welding the parts together. I may also before putting the parts together soften those portions of the tongues which will border upon the small grooves by treating them with sulfuric acid or any equivalent substance calculated to modify the fiber and cause it to spread more readily and to hold more firmly.

I am aware that it has been suggested, as in Letters Patent of the United States, No. 230,174, to expand by pressure pointed tongues into dovetail grooves, and I therefore limit my claim to the small lateral grooves and flat-faced tongues, as specified.

I claim—

As an article of manufacture, lumber composed of two tongue-and-grooved parts, the tongues having plain faces and the grooves having small lateral grooves with the fiber of the tongues pressed laterally thereinto, substantially as described.

In testimony whereof I affix my signature in presence of two witnesses.

DAVID GILMOUR.

Witnesses:
 HENRY E. COOPER,
 C. S. MIDDLETON.